US005447632A

United States Patent [19]

Andersson

[11] Patent Number: 5,447,632

[45] Date of Patent: Sep. 5, 1995

[54] HYDROCYCLONE PLANT

[75] Inventor: Roine Andersson, Järfälla, Sweden

[73] Assignee: Celleco Hedemora AB, Stockholm, Sweden

[21] Appl. No.: 244,865

[22] PCT Filed: Oct. 15, 1993

[86] PCT No.: PCT/SE93/00846

§ 371 Date: Jun. 13, 1994

§ 102(e) Date: Jun. 13, 1994

[87] PCT Pub. No.: WO94/09909

PCT Pub. Date: May 11, 1994

[30] Foreign Application Priority Data

Oct. 23, 1992 [SE] Sweden ............................... 9203111

[51] Int. Cl.[6] ............................................ B01D 21/26

[52] U.S. Cl. ................................ 210/512.2; 209/728; 210/787

[58] Field of Search .................. 210/512.1, 512.2, 787; 209/728, 729, 734

[56] References Cited

U.S. PATENT DOCUMENTS 3,598,731 8/1971 Frykhult et al. ................. 210/512.2
3,959,150 5/1976 Frykhult et al. ................. 210/512.2
4,426,283 1/1984 Fecske ............................. 210/512.2
4,539,105 9/1985 Metcalf ............................ 210/512.2

FOREIGN PATENT DOCUMENTS

0109764A3 10/1983 European Pat. Off. .
541344 6/1972 Switzerland .

*Primary Examiner*—Robert A. Dawson
*Assistant Examiner*—David Reitsnyder
*Attorney, Agent, or Firm*—Davis Hoxie Faithfull & Hapgood

[57] ABSTRACT

In a hydrocyclone plant for treating fibre suspensions comprising a multiplicity of hydrocyclone bodies (1) each hydrocyclone body is mounted in a hole in a wall (5) and is sealed to the wall with the aid of a sealing ring (18). According to the invention the sealing ring is made of an inexpensive chemical resistant material and is radially cut through, so that two free ends are formed on the sealing ring. The hydrocyclone body is provided with a sealing surface (12) having a radial extension which increases along the hydrocyclone body. Axially along the sealing surface (12) a projection (22) extends between the free ends of the sealing ring. When mounting the hydrocyclone body the sealing ring (8) is adapted to be entrained by the wall (5) along the sealing surface (12), so that the sealing ring is expanded and seals between the sealing surface and the wall.

5 Claims, 4 Drawing Sheets

HYDROCYCLONE PLANT

Figure 1:
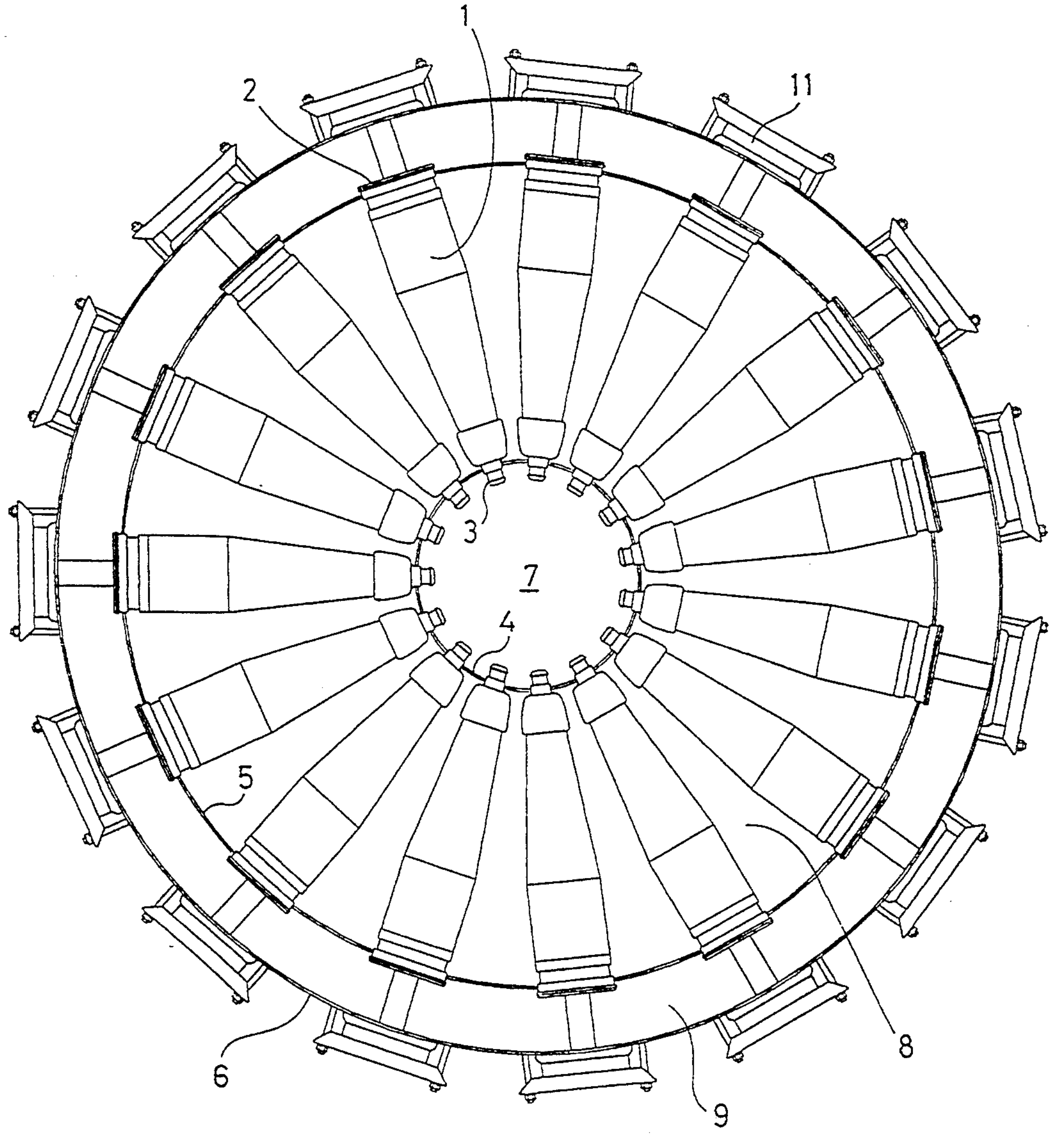

The present invention relates to a hydrocyclone plant for treating fibre suspensions comprising a multiplicity of elongated hydrocyclone bodies, each of which has an apex end and a base end, and is designed with an exterior sealing surface having a circular cross-section. In the hydrocyclone plant there is a wall provided with circular holes, into which the respective hydrocyclones are inserted, so that the sealing surfaces extend through the holes. Circular sealing rings extend around the respective sealing surfaces and are situated in the holes of the wall to seal between the sealing surfaces and the wall.

In known hydrocyclone plants of this kind the sealing rings are made of an elastic rubber material with a relatively poor resistancy to the chemicals which can be found in the fibre suspensions which are treated. Thus, the chemicals may affect the sealing rings of rubber, so that these become hard or are dissolved, which has the consequence that the seal between the sealing surfaces of the hydrocyclone bodies and said wall becomes unreliable. In addition, it may occur that the sealing rings of rubber swell, so that the hydrocyclone bodies are jammed in the wall, which results in that disassembly of individual hydrocyclone bodies is made difficult.

It is true that the sealing rings could be made of existing chemical resistant rubber material, whereby the problem of unreliable sealing and jamming of the hydrocyclone bodies could be eliminated. However, such chemical resistant rubber materials are too expensive to justify their use in a hydrocyclone plant, which may comprise hundreds of hydrocyclone bodies, each of which requires two sealing rings.

The object of the present invention is to provide in a simple and inexpensive manner a hydrocyclone plant of the kind here present, in which the seal between the hydrocyclone bodies and the wall is reliable, and in which the hydrocyclone bodies do not risk getting stuck in the wall.

This object is obtained by means of a hydrocyclone plant of the kind described initially, which mainly is characterized in that—a) each sealing ring is radially cut through, so that two opposite free ends are formed on the sealing ring as seen in the circumferential direction of the sealing ring, the sealing ring being stiff enough to prevent it from loosening from its associated hydrocyclone body in the direction transverse to the latter, when the hydrocyclone body is dismounted from the wall;—b) the sealing surface of each hydrocyclone body has a radial extension which increases along the sealing surface in the direction towards the base end of the hydrocyclone body and is provided with a projection extending axially along the sealing surface and between the free ends of the sealing ring associated to the sealing surface; c) each sealing ring is dimensioned such that it is insertable into any of the holes of the wall, when the sealing ring is situated in a first position on its associated sealing surface, and is expanded by the sealing surface, so that the sealing ring seals between the wall and the sealing surface, when the sealing ring is inserted into any of the holes of the wall and is situated in a second position on the sealing surface, in which the sealing surface has a greater diameter than in said first position; and —d) each sealing ring is provided with a radially outwardly directed stop, which is adapted to abut against the wall, so that the sealing ring is entrained by the wall from said first position to said second position, when the sealing ring is inserted into any of the holes of the wall and the hydrocyclone body on which the sealing ring is applied is displaced with its apex end leading through said holes in the wall.

Hereby the sealing rings need not be elastic but can be made of an inexpensive elastic plastic or moulded plastic compound which is resistant to the chemicals which can be found in the fibre suspensions which are treated.

Advantageously the projection on the sealing surface of each hydrocyclone body is dimensioned such that it substantially fills up the hole which is created between the sealing surface, when the sealing ring is situated in said second position on the sealing surface and seals between the sealing surface and the wall. Since the free ends of the sealing ring are moved away from each other, when the sealing ring expands during displacement of it along the sealing surface, the projection suitably has an extension in the circumference of the sealing surface which increases along the sealing surface in the direction towards the base end of the hydrocyclone body.

According to a preferred embodiment of the hydrocyclone plant according to the invention each sealing surface has a first cylindrical portion, a second cylindrical portion having greater diameter than the first portion, and a conical portion extending from the first cylindrical portion to the second cylindrical portion. In this case the projection on the sealing surface of each hydrocyclone body suitably has an extension in the circumference of the sealing surface which increases continuously along the conical portion of the sealing surface in the direction towards the base end of the hydrocyclone body.

Figure 2:
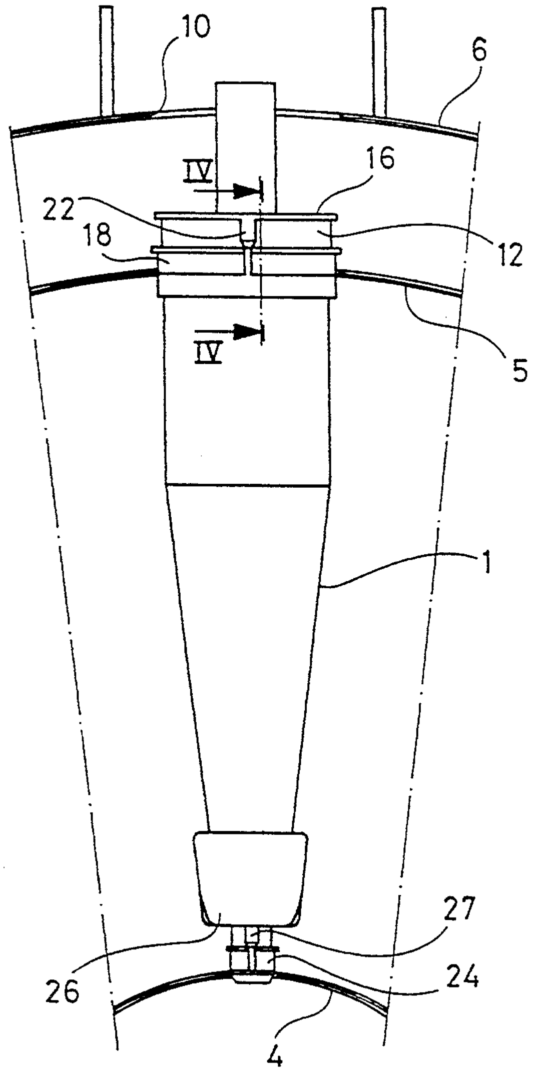
Figure 3:
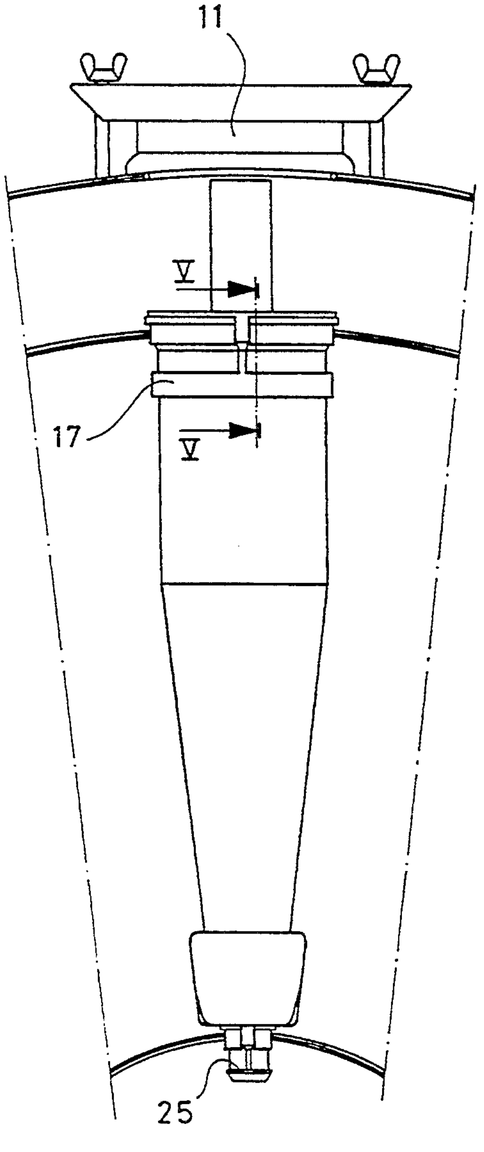
Figure 4:
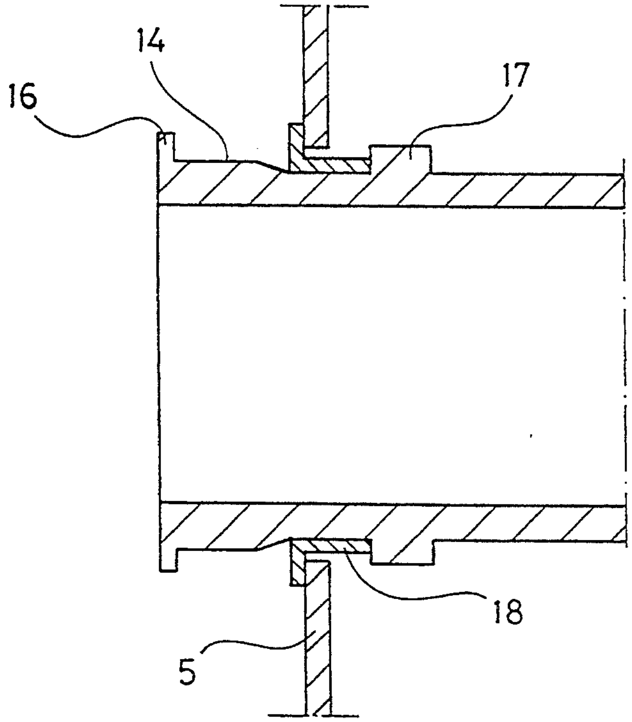
Figure 5:
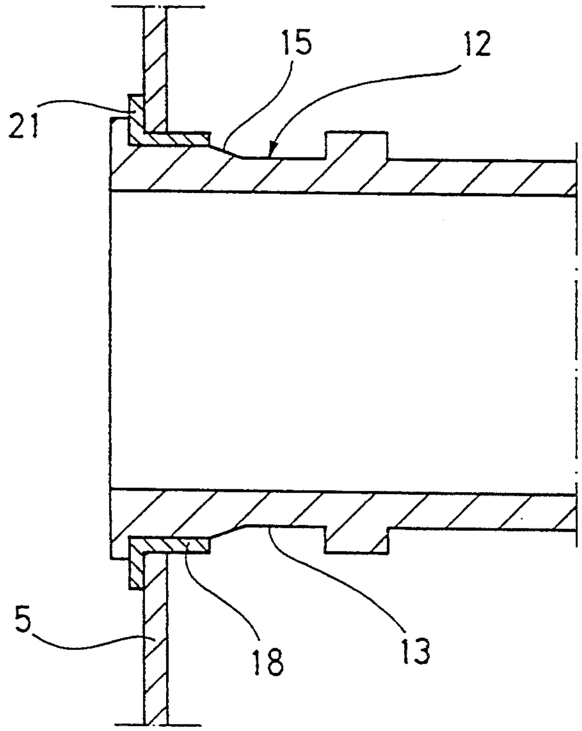
Figure 7:
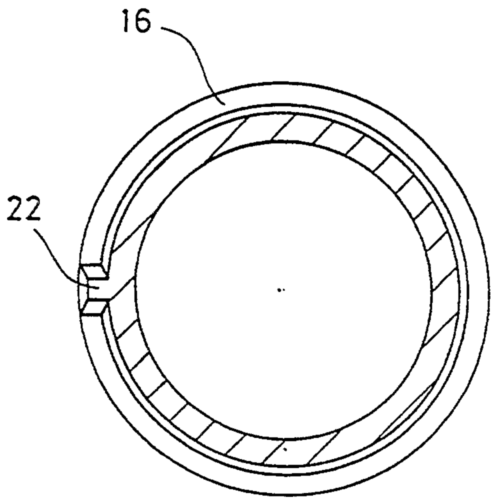
Figure 6:
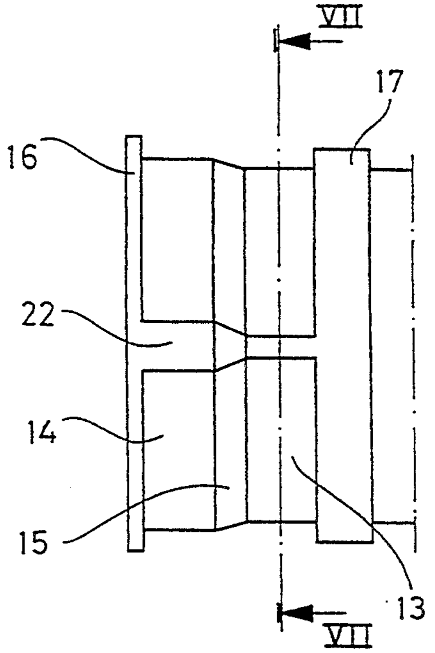
Figure 9:
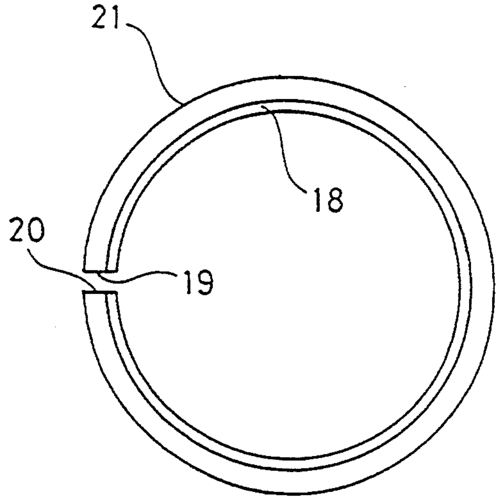
Figure 8:
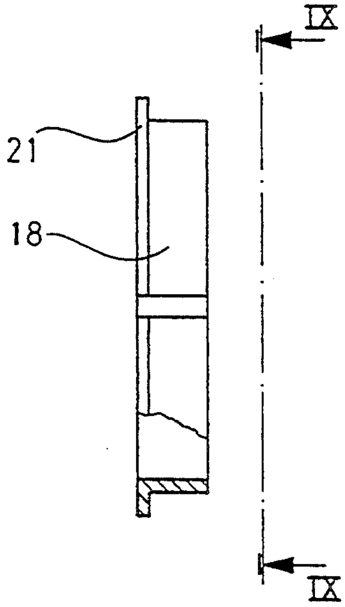

The invention is explained more closely in the following with reference to the accompanying drawings, in which FIG. 1 shows a hydrocyclone plant according to the invention, FIG. 2 shows a detail of the hydrocyclone plant according to FIG. 1 with a hydrocyclone body in a dismounted position, FIG. 3 shows the same detail as FIG. 2, but with the hydrocyclone body in a mounted sealing position, FIG. 4 shows a section along the line IV—IV in FIG. 2, FIG. 5 shows a section along the line V—V in FIG. 3, FIG. 6 shows a part of a hydrocyclone body in the hydrocyclone plant according to FIG. 1, FIG. 7 shows a sectional view along the line VII—VII in FIG. 6, FIG. 8 shows a sealing ring for the hydrocyclone body according to FIG. 6, and FIG. 9 shows a view along the line IX—IX in FIG. 8.

The hydrocyclone plant shown in FIG. 1 comprises a multiplicity of elongated hydrocyclone bodies 1, each of which tapers from a base end 2 to an apex end 3. Three cylindrical vertical walls 4–6 are arranged concentrically with each other so that a cylindrical space 7 for a created heavy fraction is defined by the innermost situated wall 4, an annular space 8 for a fibre suspension to be treated is defined by the innermost wall 4 and the intermediate wall 5, and an annular space 9 for a created light fraction is defined by the intermediate wall 5 and the outermost situated wall 6. The hydrocyclone bodies 1 extend radially in the annular space 8 and are regularly allocated around the cylindrical space 7. Each hydrocyclone body 1 extends at its base end 2 through a hole in the intermediate wall 5 and at its apex end 3 through a hole in the innermost wall 4. In the outermost wall 6 there are holes 10, through which the hydrocyclone bodies 1 can be mounted on and dismounted from the hydrocyclone plant. The holes 10 are closed by removable lids 11.

Each hydrocyclone body 1 is designed at its base end 2 with an exterior sealing surface 12, which comprises a first circular cylindrical portion 13, a second circular cylindrical portion 14 having a greater diameter than the portion 13, and a conical portion 15 extending between the portions 13 and 14. The sealing surface 12 is axially defined by two annular stops 16 and 17 on the outside of the hydrocyclone body 1.

Around each sealing surface 12 there is extending a circular sealing ring 18, which consists of a resilient material and which is radially cut through, so that two opposite free ends 19,20 are formed on the sealing ring 18 as seen in the circumferential direction of the sealing ring 18. The sealing ring 18 is stiff enough to be prevented from loosening from its hydrocyclone body 1 in the direction transverse to the latter. Axially along the hydrocyclone body 1 the freedom of movement of the sealing ring 18 is limited by the stops 16 and 17. The sealing ring 18 is provided with a stop in the form of a radially outwardly directed flange 21 having greater transversal extension than the holes of the wall 5 and situated at the axial end of the sealing ring 18 which is closest to the base end 2 of the hydrocyclone body 1.

Each sealing surface 12 is provided with a projection 22, which extends axially along the sealing surface 12 and between the free ends 19,20 of the associated sealing ring 18. The extension of the projection 22 in the circumference of the sealing surface 12 increases continuously along the conical portion 15 in the direction towards the base end of the hydrocyclone body 1.

To seal against the innermost wall 4 each hydrocyclone body is provided at its apex end 3 with a sealing surface 23, a sealing ring 24, stops 25,26, and a projection 27 (FIGS. 2 and 3), which are formed analogous to and has the same function as the above described corresponding components at the base end 2 of the hydrocyclone body 1 and therefore need not be further explained.

When mounting a hydrocyclone body 1 it is brought with its apex end 3 leading in the direction of movement into any of the holes 10 of the outermost wall 6 and further through fitting holes in the walls 5 and 4 to the position shown in FIG. 2 and 4. In this position the sealing ring 18 is situated on the cylindrical portion 13 of the sealing surface 12 and is inserted into the hole of the wall 5, so that the wall 5 abuts against the flange 21 of the sealing ring 18. When the hydrocyclone body 1 is brought further into the holes of the walls 4 and 5 to the sealing position shown in FIG. 3 and 5 the sealing ring 18 is entrained by the wall 5 and is expanded by the conical portion 15, so that the sealing ring 18 seals between the wall 5 and the sealing surface 12, when the sealing ring 18 has been entrained to the cylindrical portion 14 of the sealing surface 12. The projection 22 is dimensioned such that it substantially fills up the hole which is formed between the sealing surface 12, the wall 5 and the free ends 19,20 of the sealing ring 18, when the hydrocyclone body 1 is in the sealing position shown in FIG. 3 and 5.

When dismounting any hydrocyclone body 1 from the hydrocyclone plant the hydrocyclone body 1 is pulled radially outwardly from the walls 4–6. The sealing ring 18 of the hydrocyclone body 1 is entrained by the wall 5, so that the sealing ring 18 glides along the cylindrical portion 14 of the sealing surface 12 towards the stop 17. When the sealing ring 18, which is in a yielded expanded state, passes the conical portion 15 it springs back and gets a smaller diameter than the hole of the wall 5. The sealing ring 18 is therefore easily released from the wall 5, when the sealing ring 18 reaches the cylindrical portion 13 and abuts against the stop 17.

I claim:

1. A hydrocyclone plant for treating fibre suspensions comprising a multiplicity of elongated hydrocyclone bodies (1), each of which has an apex end (3) and a base end (2), and is designed with exterior sealing surfaces (12,23) having circular cross-sections, a wall (4,5) provided with circular holes, into which the respective hydrocyclone bodies are inserted, so that the sealing surfaces extend through the holes, and circular sealing rings (18,24) extending around the respective sealing surfaces and situated in the holes of the wall to seal between the sealing surfaces and the wall, wherein each sealing ring (18,24) is radially cut through to form two opposite free ends (19,20) on the sealing ring as seen in the circumferential direction of the sealing ring, the sealing ring being stiff enough to prevent it from loosening from its hydrocyclone body (1) in a direction transverse to the latter, when the hydrocyclone body is dismounted from the wall (4,5), and wherein the sealing surface (12,23) of each hydrocyclone body (1) has a radial extension which increases along the sealing surface in the direction towards the base end (2) of the hydrocyclone body and is provided with a projection (22,27) extending axially along the sealing surface and between the free ends (19,20) of the sealing ring (18,24) on the sealing surface, each sealing ring (18,24) being dimensioned so that it is insertable into any of the holes of the wall (4,5), when the sealing ring is situated in a first position on its sealing surface (12,23), and is expanded by the sealing surface, to seal between the wall and the sealing surface, when the sealing ring is inserted into any of the holes of the wall and is situated in a second position on the sealing surface, in which second position the sealing surface has a greater diameter than in said first position, and each sealing ring (18,24) being provided with a radially outwardly directed stop (21), which is adapted to abut against the wall (4,5), so that the sealing ring is carried by the wall from said first position to said second position when the sealing ring is inserted into any one of the holes of the wall and the hydrocyclone body (1), on which the sealing ring is applied, is displaced, with its apex end (3) leading, through said hole in the wall.

2. A hydrocyclone plant according to claim 1, wherein the projection (22,27) of each sealing surface (12,23) is dimensioned so that it substantially fills up the space which is formed between the sealing surface, the wall (4,5) and the free ends (19,20) of the sealing ring (18,24), on the sealing surface when the sealing ring is in said second position and is expanded by the sealing surface.

3. A hydrocyclone plant according to claim 2, wherein the projection (22,27) on the sealing surface (12,23) of each hydrocyclone body (1) has a circumferential extension which increases along the sealing surface in the direction towards the base end (2) of the hydrocyclone body.

4. A hydrocyclone plant according to claim 1 wherein each sealing surface (12,23) comprises a first cylindrical portion (13), a second cylindrical portion (14) having a greater diameter than the first cylindrical portion, and a conical portion (15) tapering from the second cylindrical portion to the first cylindrical portion.

5. A hydrocyclone plant according to claim 4, wherein the projection (22,27) on the sealing surface (12,23) of each hydrocyclone body (1) has a circumferential extension which increases along the conical portion (15) of the sealing surface in the direction towards the base end (2) of the hydrocyclone body.

* * * * *